(12) United States Patent
Whitney

(10) Patent No.: US 11,927,238 B1
(45) Date of Patent: Mar. 12, 2024

(54) INTERNAL VISCOUS ROTATIONAL DAMPING ASSEMBLY

(71) Applicant: Riverhawk Company, New Hartford, NY (US)

(72) Inventor: Robert M. Whitney, Whitesboro, NY (US)

(73) Assignee: Riverhawk Company, New Hartford, NY (US)

( * ) Notice: Subject to any disclaimer, the term of this patent is extended or adjusted under 35 U.S.C. 154(b) by 0 days.

(21) Appl. No.: 18/335,482

(22) Filed: Jun. 15, 2023

Related U.S. Application Data (63) Continuation of application No. 18/155,209, filed on Jan. 17, 2023.

(51) Int. Cl.
*F16F 15/16* (2006.01)

(52) U.S. Cl.
CPC .......... *F16F 15/161* (2013.01); *F16F 15/165* (2013.01); *F16F 2222/12* (2013.01); *F16F 2234/02* (2013.01); *F16F 2236/08* (2013.01)

(58) Field of Classification Search
CPC .... F16F 15/161; F16F 15/165; F16F 2222/12; F16F 2234/02; F16F 2236/08
USPC ....................................................... 464/24, 97
See application file for complete search history.

(56) References Cited

U.S. PATENT DOCUMENTS

| | | | | |
|---|---|---|---|---|
| RE30,919 E | * | 5/1982 | Sautter .................... | F16C 1/108 464/97 |
| 5,697,847 A | * | 12/1997 | Meyer ..................... | F16F 15/16 464/97 |

\* cited by examiner

*Primary Examiner* — Greg Binda
(74) *Attorney, Agent, or Firm* — Woods Oviatt Gilman LLP; Dennis B. Danella, Esq.

(57) ABSTRACT

An internal viscous rotational damping (VRD) assembly for transmitting torque from a drive member connector to a load member connector is provided. The VRD assembly comprises a spacer tube connected between the drive member connector and the load member connector, wherein the spacer tube includes a longitudinal axis and an inner surface that extends along the longitudinal axis. The VRD assembly further includes a damper bar disposed within the spacer tube. The damper bar includes an outer surface, wherein a cavity is defined between the outer surface of the damper bar and the inner surface of the spacer tube, and wherein the cavity is configured for receiving a viscous fluid.

63 Claims, 10 Drawing Sheets

INTERNAL VISCOUS ROTATIONAL DAMPING ASSEMBLY

CROSS REFERENCE TO RELATED APPLICATIONS

This application is a continuation of U.S. patent application Ser. No. 18/155,209 filed Jan. 17, 2023, the contents of which are hereby incorporated by reference in its entirety.

FIELD OF THE INVENTION

The present invention is directed to a viscous rotational damper assembly for use with machinery having mating rotating shafts. In particular, the present invention is directed to an internal viscous rotational damping assembly for the management and dissipation of unwanted vibratory torque in connections between a driving shaft and a driven shaft in a machine.

BACKGROUND OF THE INVENTION

A common configuration for machinery with rotating shafts involves placing a driving machine (e.g., a motor) adjacent to a process machine (such as a pump, a compressor or a fan, for example). The shafts of these machines are roughly coaxial with a short space in between the drive shaft and the driven shaft. A coupling occupies the space between the shafts and tightly connects to them. The basic function of the coupling is to transmit power between the shafts from the drive shaft of the motor to the driven shaft of the pump or other device, in the above example. Due to its connective nature, many couplings may provide additional functions as well, such as flexibility to accommodate misalignment.

Vibratory torque in a machinery shaft can become a problem if it is large enough to produce destructive damaging stresses or excessive slippage of mating surfaces within the shaft structure. Excessive vibratory torque energy can be dissipated in order to keep torque amplitudes below damaging levels. There are a number of solutions in the industry that address the need for the management and dissipation of unwanted vibratory torque, but currently available solutions have various weaknesses that limit applicability for a significant number of applications which could otherwise benefit from a damping feature.

Figure 1:
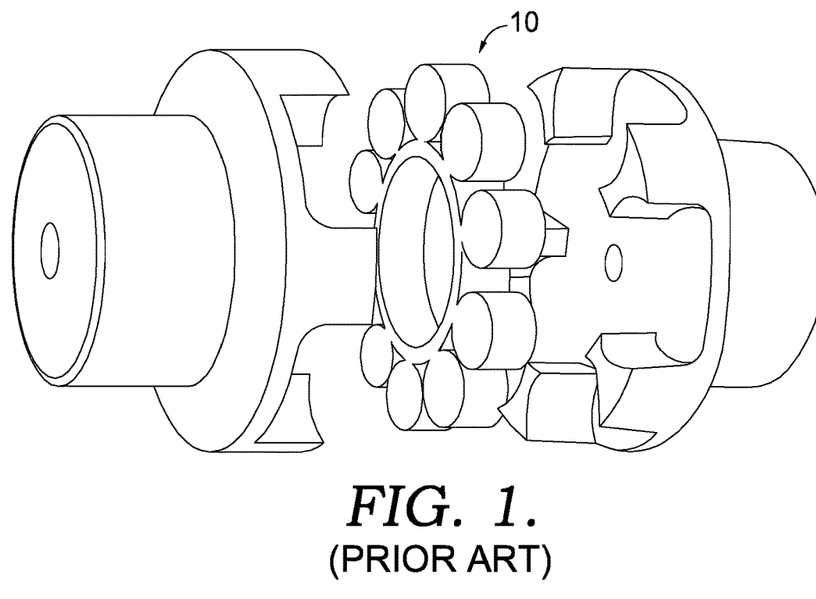
FIG. 1 shows a compression type coupling in accordance with the prior art.
Figure 2:
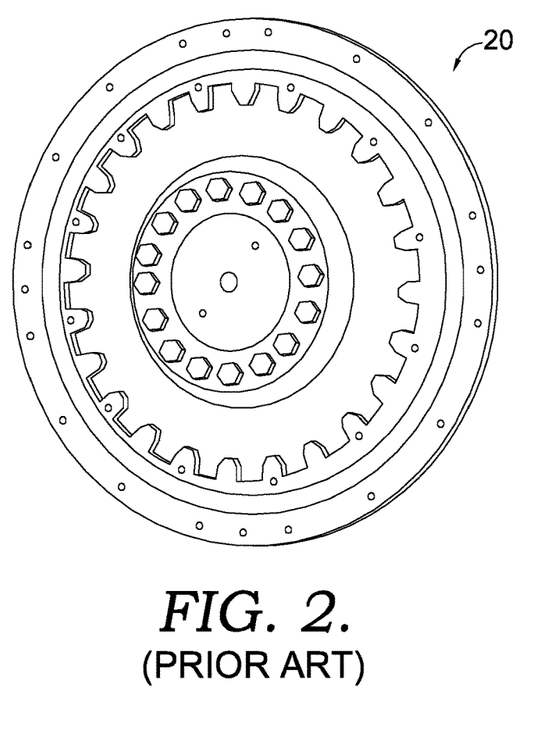
FIG. 2 shows a shear type coupling in accordance with the prior art.

At present there are a number of solutions available for absorption and dissipation of unwanted torsional oscillation energy. The most common solutions incorporate elastomeric members in the torque path that flex under varying torsional loads, as shown in FIG. 1 and FIG. 2. The elastomer is formulated of materials that have a low elastic modulus and high hysteresis. Each time they flex, some mechanical energy is absorbed into the material, which provides a desirable damping effect. FIG. 1 illustrates a compression type coupling 10, and FIG. 2 illustrates a shear type coupling 20, which are known examples of elastomeric coupling technology.

However, the example elastomeric coupling technologies shown in FIGS. 1 and 2 suffer from several weaknesses that make these and other similar elastomeric couplings undesirable to many equipment designers and users. Elastomers are generally weak materials, as compared to traditional steel shaft materials. To overcome this, elastomer elements must be relatively large and heavy for a given shaft size. Adjacent components that support the elastomer components must also be relatively large and heavy. These large components combine to produce couplings that are larger and heavier than many machinery applications can support. Elastomers are generally poor conductors of heat, and their strength and stiffness properties are strongly dependent upon temperature. They become compliant and weak with a relatively small increase in temperature. These properties combine to severely limit the rate of energy dissipation that the coupling can absorb, putting severe limits to the steady state capacity of these couplings. With mechanical properties of elastomers being temperature dependent, environmental temperature changes can dramatically change the couplings ability to dampen alternating torques. Elastomers are often reactive with various air-borne chemicals that are often found in industrial environments, such as ozone and volatile hydrocarbons. Over time, reaction of the elastomer with chemicals in the environment can degrade the flexibility and damping properties of the coupling. All of the above factors combine to make application of the present elastomeric coupling technology unpredictable and difficult to apply to many applications that would otherwise benefit from a damping coupling.

Figure 3:
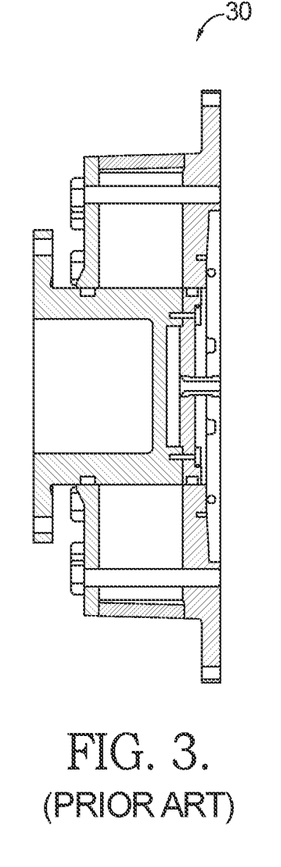
FIGS. 3 and 3A show a cross-section and a partial cross-section of a leaf spring coupling in accordance with the prior art, respectively.
Figure 3A:
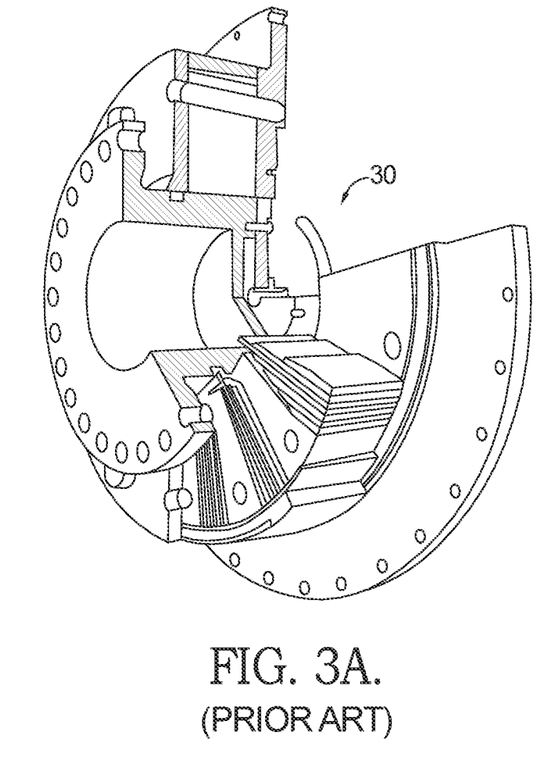

Another solution for absorbing and dissipating unwanted vibratory torque involves the use of leaf spring couplings 30, as shown in FIGS. 3 and 3A, to transmit torque from a driving machine to a process/load machine by loading a set of radially mounted metal leaf springs, where the outer end of the leaf spring is rigidly connected to one machine and the inner end is flexibly connected to the other machine. When torque is applied, all of the leaf springs are loaded as cantilevers. This cantilever loading provides the force required to transmit torque. The leaf springs deflect under load, providing the necessary torsional spring characteristics. In FIG. 3, the leaf springs reside within a series of semi-enclosed chambers that are filled with oil or other viscous fluid. The leaf spring divides the chamber into two sub-chambers. The springs deflect when torque is applied, causing one sub-chamber to contract and the other to expand. A gap between the spring edge and the cover allows oil to flow through a restricted passage. When torque varies, such as when torsional vibration is present, the oil is forced back and forth through the restriction, whereby vibratory energy is converted to turbulence and to heat. The combination of the leaf spring element and semi-enclosed chambers of leaf spring couplings 30 provides a damping effect.

However, the example leaf spring coupling technology of FIG. 3 also has a number of weaknesses. The inner end of the leaf spring is connected to the inner member in a way that allows rotational sliding of the spring tip. Over long term operation, repeated sliding leads to wear of the joint, which erodes material from the mated parts and generates wear particles that contaminates the fluid and, when deposited on seal surfaces, can cause wear and leakage. The outer end of the leaf spring is connected in a manner which is considered rigid. However, during flexing the mated top and bottom faces rub. This causes wear to occur at the interfaces that can lead to surface erosion, cold welding, and generation of wear particles. Wear leads to gaps at critical interfaces, which degrades power transmission efficiency and balance. Also, the inner member is not fixedly connected to the outer member, which is a problem for machinery that requires the flanges to remain in parallel and must transmit bending and axial forces. Spacers for double flex couplings and machines that receive support from adjacent machines require lash-free operation in order to maintain balance. The lash that is inherent to these designs is not compatible with the requirements of many relevant machinery types. Additionally, the leaf spring design possesses many parts requiring many joints. This makes for a large and heavy assembly, which limits application in machinery that requires small, light, and tightly balanced shaft elements. Thus, leaf spring coupling technology is directed mainly at applications that allow for large, heavy damping solutions that will tolerate periodic maintenance and high unbalance.

Accordingly, there is a need for a torque damping coupling technology that is light, able to dissipate torsional vibration energy effectively, provides the benefits of independent damping and stiffness, low weight, simplicity, durability, and high symmetry for low unbalance.

SUMMARY OF THE INVENTION

The present invention addresses the above needs and others by providing an internal viscous rotational damper (VRD) assembly, which is configured to transmit continuous torque and damp alternating torque vibrations created between shafts connected in a machine. The VRD assembly is designed to fit in the space between separated machinery shafts, such as a drive shaft of a driving machine and a driven shaft of a process or load machine. The VRD assembly may be mounted between the flex elements of a flexible coupling forming a spacer portion of the coupling. This approach provides the equipment designer with the advantage of being able to mate the VRD assembly to flex elements of choice while allowing design for damped torsional natural frequencies.

Briefly described, one aspect of the present invention provides an internal viscous rotational damping (VRD) assembly for transmitting torque from a drive member connector to a load member connector. The drive member connector is coupled to a driving input shaft and the load member connector is coupled to a driven output shaft. The internal VRD assembly comprises a spacer tube connected between the drive member connector and the load member connector. The spacer tube includes a longitudinal axis and an inner surface that extends along the longitudinal axis. A damper bar is disposed within the spacer tube. The damper bar includes an outer surface. A cavity is defined between the outer surface of the damper bar and the inner surface of the spacer tube and the cavity is configured for receiving a viscous fluid.

In a further aspect of the present invention, the spacer tube further includes a first end connected to the drive member connector and a second end connected to the load member connector. The damper bar extends between the first end and the second end of the spacer tube. The damper bar includes a first end fixedly connected to one of the first end of the spacer tube or the second end of the spacer tube and a second end not fixedly connected to the other of the first end of the spacer tuber or the second end of the spacer tube. The first end of the damper bar is fixedly connected with the one of the first end of the spacer tube or the second end of the spacer using at least one key disposed between the inner surface of the spacer tube and the outer surface of the damper bar and the at least one key is a plurality of keys, and the plurality of keys are radially disposed about the longitudinal axis of the spacer tube.

In another aspect of the present invention, the first end of the damper bar includes a fill port defined therein that is in fluid communication with the cavity. A plug is configured to be selectively disposed in the fill port for retaining the viscous fluid in the cavity. The second end of the damper bar includes a relief port defined therein that is in fluid communication with the cavity and a plug is configured to be selectively disposed in the relief port for retaining the viscous fluid in the cavity. A buffer chamber is defined in the second end of the damper bar and is configured for receiving the viscous fluid. The viscous fluid includes gear oil, grease, or other lubricant.

In still another aspect of the present invention, a cap is disposed adjacent to the second end of the damper bar and a shunt installed between the second end of the damper bar and the cap and is configured to allow the damper bar to twist to provide protection against over-torque between the drive member connector and the load member connector. A seepage capture chamber is defined between the second end of the damper bar and the cap. The seepage capture chamber is configured to capture seepage of the viscous fluid. The shunt is defined by a set of axially oriented pins that extend between the second end of the damper bar and the cap. The pins are fixed to the second end of the damper bar and extend into corresponding apertures defined in the cap. The apertures defined in the cap are configured for receiving the pins to allow limited twisting motion of the pins until the pin engages a wall of the corresponding aperture.

As further described herein, another aspect of the present invention provides a damper bar for use with an internal viscous rotational damping (VRD) assembly, wherein the VRD assembly includes a spacer tube connected between a drive member connector and a load member connector. The spacer tube includes a longitudinal axis and an inner surface that extends along the longitudinal axis. The damper bar is disposed within the spacer tube and comprises a first end fixedly connected with the spacer tube, a second end that is not fixedly connected with the spacer tube and an outer surface spaced apart from the inner surface of the spacer tube to define a cavity therebetween configured for receiving a viscous fluid in the cavity.

In another aspect of the present invention, the first end of the damper bar is fixedly connected with the spacer tube using at least one key disposed between the inner surface of the spacer tube and the outer surface of the damper bar. The at least one key is a plurality of keys and the plurality of keys are radially disposed about the longitudinal axis of the spacer tube.

In a further aspect of the present invention, the first end of the damper bar includes a fill port defined therein that is in fluid communication with the cavity. A plug is configured to be selectively disposed in the fill port for retaining the viscous fluid in the cavity. The second end of the damper bar includes a relief port defined therein that is in fluid communication with the cavity. A plug configured to be selectively disposed in the relief port for retaining the viscous fluid in the cavity. A buffer chamber is defined in the second end of the damper bar and is configured for receiving the viscous fluid.

Another aspect of the present invention provides a flexure spacer coupling comprising a drive member connector coupled to a driving shaft, a load member connector coupled to a driven shaft, an internal viscous rotational damping assembly configured for transmitting torque between the drive member connector and the load member connector, a spacer tube connected between the drive member connector and the load member connector wherein the spacer tube includes a longitudinal axis and an inner surface that extends along the longitudinal axis, a damper bar disposed within the spacer tube wherein the damper bar includes an outer surface and wherein a cavity is defined between the outer surface of the damper bar and the inner surface of the spacer tube, and a viscous fluid disposed within the cavity.

Some advantageous features and benefits of the VRD assembly according to example embodiments described herein include, but are not limited to, having a compact and light-weight design, eliminating the need for elastomeric elements that are prone to overheating and degradation, providing efficient heat dissipation, providing superior damping and stiffness linearity, and allowing for independent tuning of damping and stiffness.

BRIEF DESCRIPTION OF THE DRAWINGS

The above-mentioned and other features and advantages of this invention, and the manner of attaining them, will become apparent and be better understood by reference to the following description of the invention in conjunctions with the accompanying drawings, wherein.

DETAILED DESCRIPTION OF THE INVENTION

Referring to the drawings in detail, an aspect of the present invention includes a viscous rotational damper (VRD) assembly for use with a flexure spacer coupling disposed between a driving shaft and a driven shaft. Industries which require high power density shaft elements, tight balance, and long-term reliability can benefit from the VRD assembly solution of the present invention, which addresses weaknesses of the current state of the art and provides the properties described in more detail below.

Figure 4:
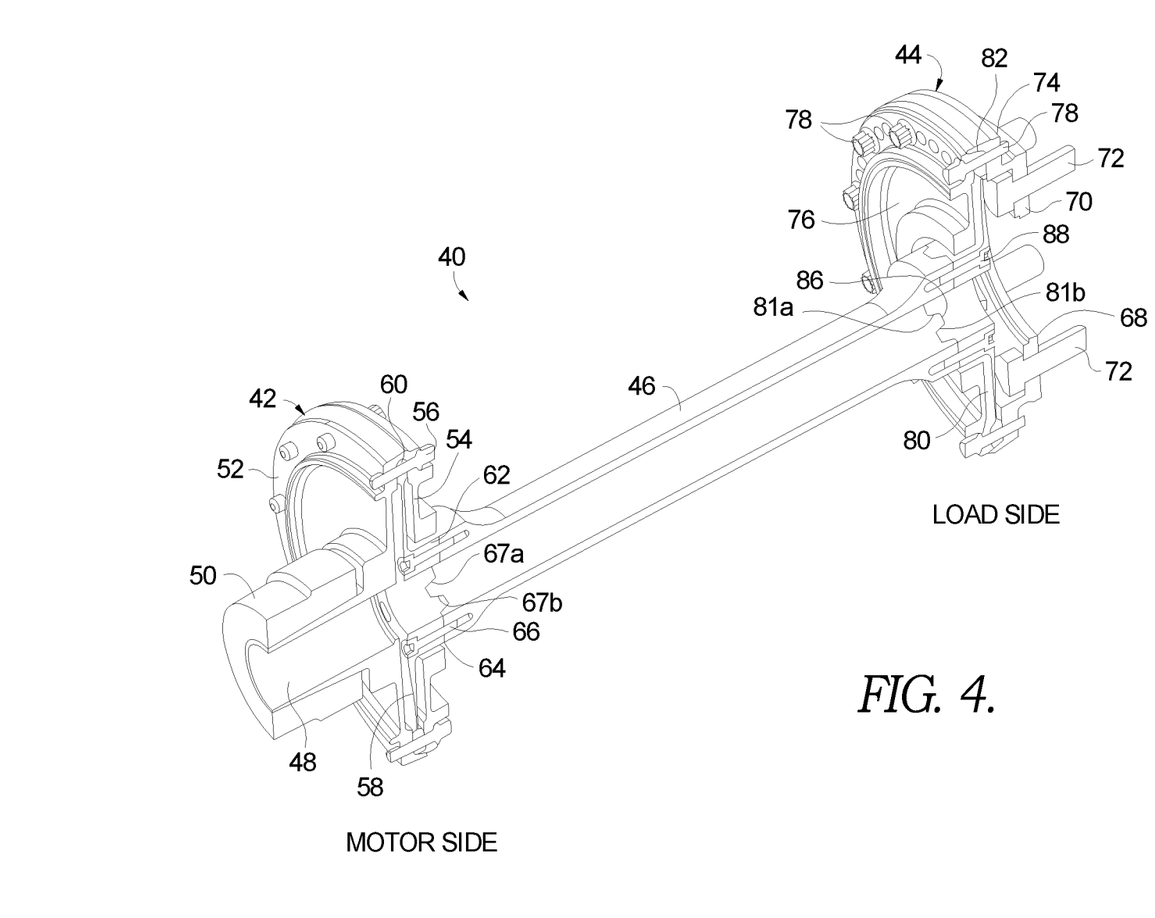
FIG. 4 is a cross-sectional view of a double flexure spacer coupling that may be used with an embodiment of the present invention.

As best seen in FIG. 4, an exemplary double flexure spacer coupling 40 that can be used with one embodiment of the present invention is provided. Double flexure spacer coupling 40 may include a drive member connector 42, a load member connector 44, and an elongated spacer tube 46 disposed therebetween.

Drive member connector 42, such as a hub, may include an end 48 that is configured for being securely coupled with a driving input shaft 50 of a motor, for example. Drive machine connector 42 further includes a flange end 52 that may be secured to a guard 54 using a plurality of fasteners 56 radially spaced around flange end 52. Further, a flexible element 58 is disposed within a space defined between flange end 52 and guard 54. In particular, flexible element 58 includes a first end 60 positioned between flange end 52 and guard 54, and coupled therebetween using fasteners 56. A second end 62 of flexible element 58 is in turn connected to a first distal end 64 of spacer tube 46 using at least one fastener 66. Further, second end 62 of flexible element 58 may be formed with a plurality of teeth 67a that are configured to mesh with corresponding teeth 67b formed in first distal end 64 of spacer tube 46 to cause flexible element 58 and spacer tube 46 to rotate in unison with one another.

Load member connector 44 may include a flange 68 having a first end 70 that is configured for being securely coupled with a driven output shaft (not shown) of a load machine using a plurality of fasteners 72. Flange 68 further includes a second end 74 that may be secured to a guard 76 using a plurality of fasteners 78 radially spaced around second end 74. A flexible element 80 may be disposed within a space defined between second end 74 and guard 76. In particular, flexible element 80 includes a first end 82 positioned between second end 74 and guard 76, and coupled therebetween using fasteners 78. A second end 84 of flexible element 80 is in turn connected to a second distal end 86 of spacer tube 86 using at least one fastener 88. Further, second end 84 of flexible element 80 may be formed with a plurality of teeth 81a that are configured to mesh with corresponding teeth 81b formed in second distal end 86 of spacer tube 46 to cause flexible element 80 and spacer tube 46 to rotate in unison with one another.

Spacer tube 46, also referred to as torque tube, is suspended between the drive machine and the load machine with first distal end 64 on the drive machine side (left end) and second distal end 86 on the load machine side (right end). Flexible elements 58, 80 may be implemented by a diaphragm, for example, although example embodiments are not limited thereto and other suitable substitutes are also possible for the flexible elements.

The above-referenced double flexure spacer coupling 40 is designed to transmit rotational power from driving machine to a load device while at the same time minimizing reaction forces produced by misalignments between driving shaft 50 and the driven shaft through flexing of flexible elements 42, 48. However, it should be appreciated that flexure spacer couplings 40 themselves are not designed to dampen torsional vibrations and spacer tube 46 provides no vibrational damping itself.

In order to address the above-described need for damping in systems of machines having rotating shafts, while not interfering with the desirable benefits of flexible spacer coupling 40, an internal viscous rotational damper (VRD) assembly 90 is provided according to one exemplary embodiment of the present invention, as described in detail below with reference to FIGS. 5-7.

Figure 5:
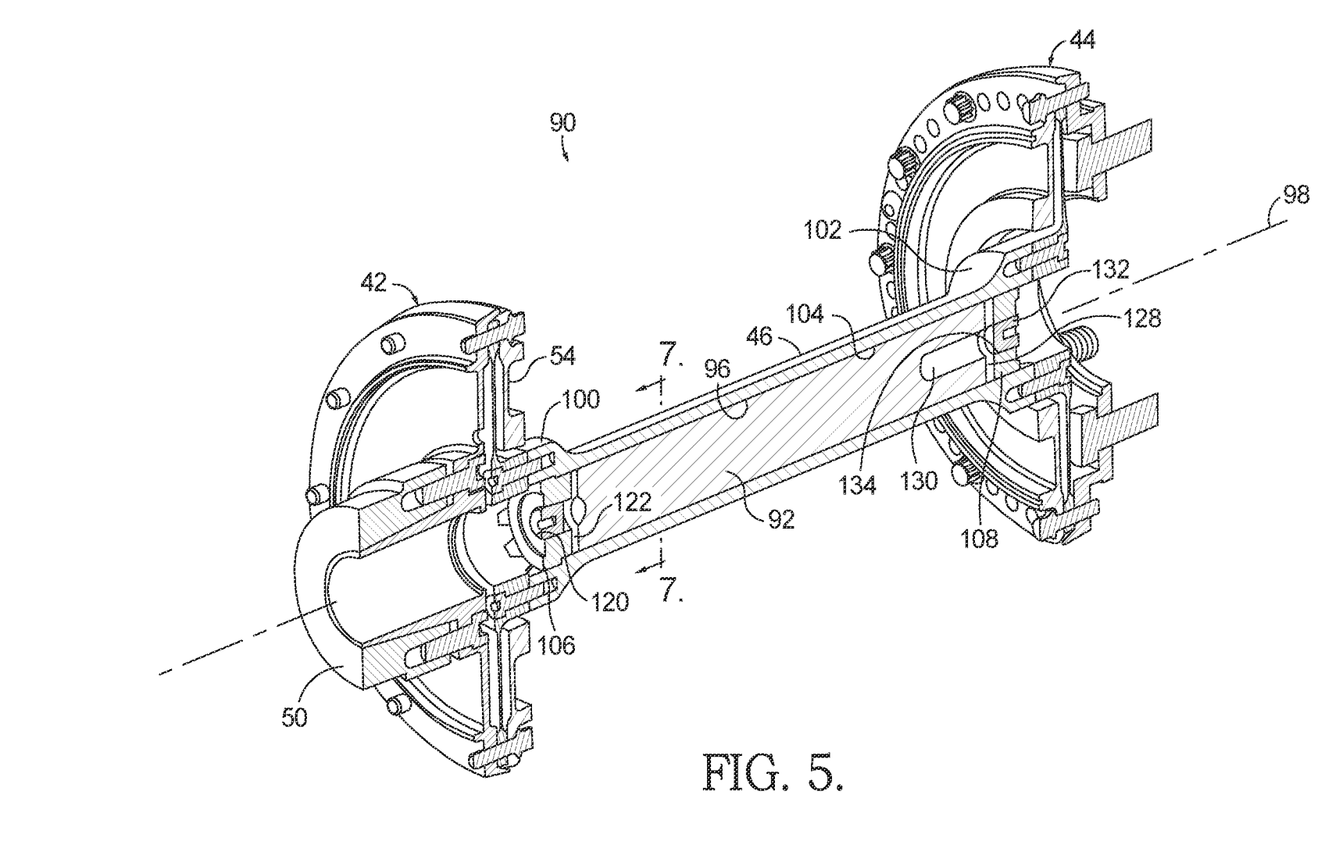
FIG. 5 is a cross-sectional view of an internal viscous rotational damper assembly including a damper bar within the spacer coupling shown in FIG. 4 in accordance with one embodiment of the present invention.

As best seen in FIG. 5, an internal VRD assembly 90 may be used in conjunction with drive member connector 42 and load member connector 44 described above with respect to FIG. 4. As seen in FIGS. 5-7, VRD assembly 90 includes spacer tube 46, a damper bar 92, and a thick, viscous damping fluid 94.

As shown in FIGS. 4 and 5, spacer tube 46 extends between and is connected to flexible elements 58, 80. The primary function of spacer tube 46 is to transmit power in the form of rotation and torque from drive shaft 50 to the load machine. When torque is applied to spacer tube 46, A natural characteristic of spacer tube 46 is that it twists elastically when torque is applied. In the VRD assembly 90, spacer tube 46 is dimensioned to maximize twist under load forming a resilient member. When torque varies with time, spacer tube 46 responds with a twisting motion, which produces a rotational end-to-end variation, which is a useful element in the design of VRD assembly 90. Competing with this desired property is the strength requirement that is dictated by the requirements of the application. The dimensions and/or the material of spacer tube 46 can be adjusted in order to provide the best balance of strength and flexibility. Materials like high-strength alloy steel or titanium along with thin wall sections can help achieve the desired characteristics.

As best seen in FIG. 5, damper bar 92 is configured for being disposed within a channel 96 defined by spacer tube 46 along a longitudinal axis 98 of spacer tube 46. For example, damper bar 92 may extend within channel 96 between first and second ends 100, 102 of spacer tube 46. Further, damper bar 92 is configured to have a diameter D1 that is slightly smaller than a diameter D2 of channel 96 to form a cavity 104 therebetween for accommodating damping fluid 94. In some example embodiments, damper bar 92 may be formed of an aluminum material. Further, cavity 104 between damper bar 92 and spacer tube 46 may be less than 1/16 inch, for example, although example embodiments are not limited thereto. With continued reference to FIG. 5, damper bar 92 includes a first end 106 adjacent to first end 100 of spacer tube 46 on the drive machine side, and a second end 108 adjacent to second end 102 of spacer tube 46 on the load machine side. The first end 106 of damper bar 92 is rigidly connected or engaged with first end 100 of spacer tube 46, such that damper bar 92 is rotationally fixed relative to spacer tube 46 so damper bar 92 rotates along with drive member connector 42 and drive shaft 50. This fixed connection can be implemented using different mechanical mechanisms, including but not limited to one or more axial keys 110, as shown in FIG. 6. For example, each key 110 may be radially positioned about longitudinal axis 98 and disposed within corresponding recesses 112, 114 formed in an outer surface 116 of first end 106 of damper bar 92 and inner surface 118 of first end 100 of spacer tube 46. Keys 110 operate to lock first end 106 of damper bar 92 with first end of spacer tube 46 as previously described.

Figure 6:
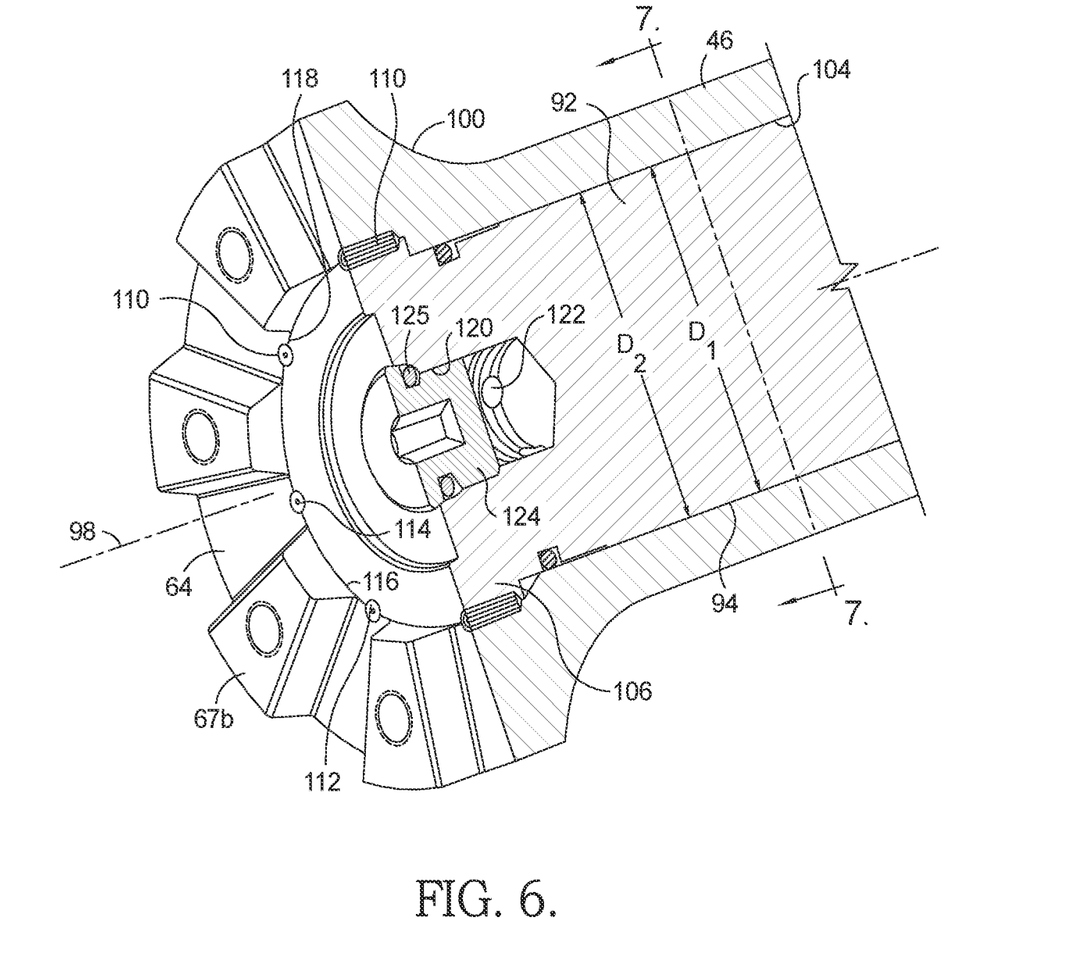
FIG. 6 shows an enlarged view of the connected end of the damper bar shown in FIG. 5.
Figure 7:
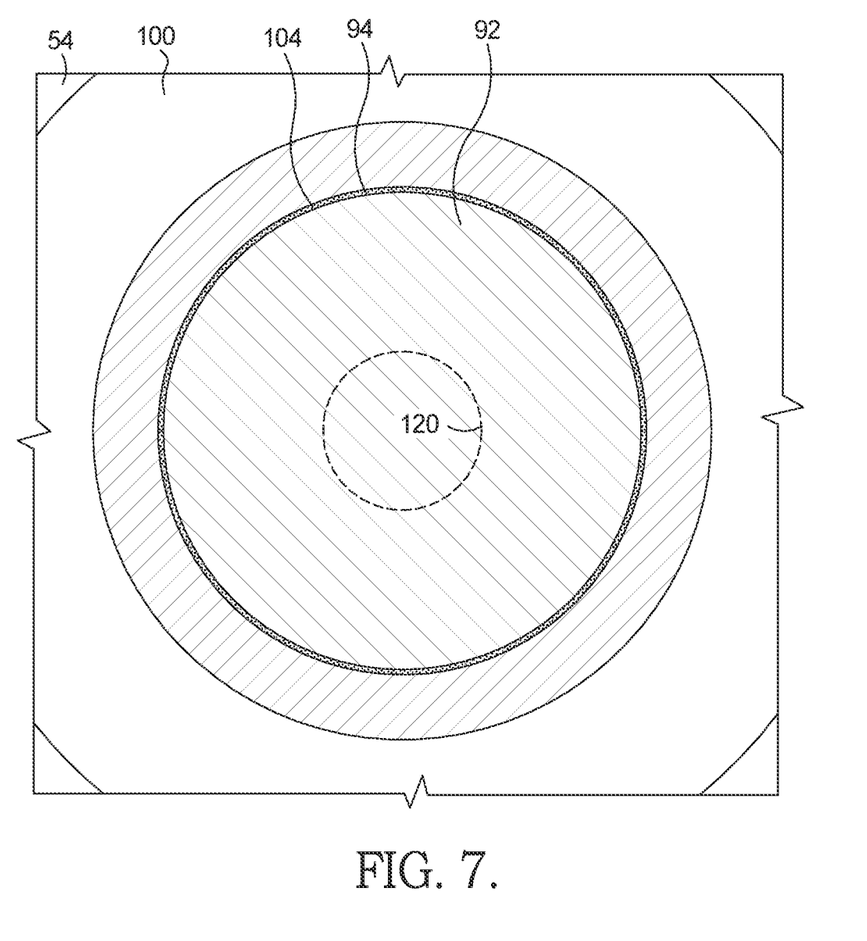
FIG. 7 shows a cross-sectional view of the damper bar and the spacer tube taken along line 7-7 in FIGS. 5 and 6.

As best seen in FIGS. 5-7, damper bar 92 further includes a fill port 120 defined in first end 106 along with one or more transverse channels 122 that are in fluid communication with cavity 104 defined between spacer tube 46 and damper bar 92. A plug 124 is configured to be removably disposed within fill port 120 via threaded connection, for example, after viscous fluid 94 is disposed within cavity 104. An gasket 125 may be used to fluidly seal plug 124 within fill port 120. Further, a gasket 126 may be positioned near first end 106 between damper bar 92 and spacer tube 46 to retain viscous fluid in cavity 104.

As best seen in FIG. 5, second end 108 of damper bar 92 is not connected torsionally to spacer tube 46 at or near second end 108 such that spacer tube 46 does not transmit any useful torque to damper bar 92 during operation, and therefore damper bar 92 does not deform when torque variations occur between drive member connector 42 and load member connector 44. Thus, when torque is applied and torque variations occur during machine operation, spacer tube 46 twist whereas damper bar 92 will not twist given that second end 108 of damper bar 92 is not connected to second end 102 of spacer tube 46. Second end 108 of damper bar 92 includes transverse channels 128 that are in fluid communication with cavity 104 and a buffer chamber 130 that provides a space for fluid 94. Second end 108 further includes a plug 132 that is disposed within a relief port 134 that allows for the release of fluid 94 if needed, for instance if the pressure within cavity 104 is greater than a predetermined amount.

Fluid 94 may be a thick, viscous damping fluid, such as gear oil, grease or another similar lubricant and may have a viscosity of at least 10,000 cSt (0.01 m$^2$/s). Fluid 94 fills cavity 104 between the outer surface of damper bar 92 and the inner surface of spacer tube 46. The above-described twisting that occurs between damper bar 92 and spacer tube 46 causes fluid 94 to shear. Fluid 94 resists the shearing motion, which provides damping to torsional vibratory motion. The absorbed vibratory energy produces heat, which causes fluid 94, damper bar 92, and spacer tube 46 to become warmer in temperature. Heat then travels through the wall of spacer tube 46 such that it is transferred into the surrounding air through convection.

With each torque pulse, spacer tube 46 twists and relaxes, and then twists and relaxes again. However, damper bar 92 does not twist and relax dynamically with each torque pulse, because it is not carrying torque. Instead, first end 106 of damper bar 92 exhibits an oscillating motion relative to spacer tube 46 at or near second end 108. Coupling that relative oscillating motion with the viscous resistance of damping fluid 94, the components of VRD assembly 90 resist the dynamic torque and absorb that energy. The thick, viscous damping fluid 94 heats up and transfers that heat out through spacer tube 46 and into the surrounding environment (atmosphere) in order to dissipate the energy resulting from the dynamic/oscillating torque. Thus, damper bar 92 itself provides differential motion, while the thick viscosity of fluid 94 provides resistance, thereby achieving the desired damping effect.

The VRD assembly 90 described above with reference to FIGS. 5-7 is useful for machines that do not run "steady" (e.g., a gentle pulse can be sensed or felt during operation), wherein pulsing results from dynamic torques coming out of the engine. One exemplary field of application of VRD assembly 90 is the automotive industry (and developing solutions for electric cars in particular), where torque is sent through the drivetrain to the wheels of the vehicle. The wheels receive both useful power (steady torque) and an oscillation (dynamic torque). However, the target equipment does not tolerate that oscillating torque very well. Therefore, it would be desirable to filter out this dynamic/oscillating torque to improve operation of the target equipment, and VRD assembly 90 described herein is designed to provide this desired torque filtering ability. It is also noted that VRD assembly 90 and its corresponding functionality could similarly be incorporated into a wide variety of other industrial designs as well in which it would be desirable to filter out a dynamic/oscillating torque component.

With the design and function of VRD assembly 90 described herein, two separate components of torque are in play: (1) steady torque, also referred to as useful power, and (2) dynamic torque, also referred to as oscillation (repeatedly increasing and decreasing torque). By the addition of damper bar 92 and its related elements and features, only the dynamic/oscillating torque is transferred down into damper bar 92, which filters it out, while the steady/useful torque is transferred to the load equipment. VRD assembly 90 is particularly advantageous in that it can adapt an existing coupling (e.g., flexible spacer coupling 40, spacer tube 46, etc.) to provide the desired dynamic/oscillating torque damping capability with little modification and by only adding a few additional components to the existing coupling design. Thus, VRD assembly 90 provides a relatively simple yet elegant solution to the problem of filtering out dynamic/oscillating torque during operation of the motor.

In summary, VRD assembly 90 shown in FIGS. 5-7 provides several advantages over the current state of the art described with reference to FIGS. 1-3, including but not limited to: (1) the short heat flow path to the surrounding air combined with conductivity of the tube material and windage caused by shaft rotation; (2) elastomers are not required to support torque loads caused by useful power, as is the case with the elastomeric coupling technologies of FIGS. 1 and 2 (and other similar rubber-based couplings), and load capacity and deflection are far more predictable for VRD assembly 90 since the elastic properties of structural metals are known to be far more linear; (3) a high degree of symmetry, which minimizes unbalance forces; (4) a simple design that incorporates very few parts; (5) no sliding of load bearing surfaces to wear or lash; (6) very low weight added to the flexible coupling, which keeps inertial forces supported by connected machines to a minimum; (7) VRD assembly 90 fits within the coupling envelope, minimizing the need for direct user interface; (8) the dimensions and materials can be tuned to the specific elastic and damping needs of the application—the damping in the fluid is separate of the elastic properties of the metal, which allows for independent adjustment of these properties, yielding a more precise result; (9) the damping material is not exposed to the atmosphere, removing the possibility of property changes due to exposure of VRD assembly 90 to aggressive environments; and (10) the buffer chamber allows the fluid to expand and contract freely as the temperature environment requires.

An alternative embodiment of an internal VRD assembly 140 with backup and seal cap features is described below with reference to FIGS. 8-10. VRD assembly 140 provides similar advantages as set forth above with regard to VRD assembly 90 of FIGS. 5-7, along with some additional advantages that are provided via integration of two further features near the free end of the damper bar.

Figure 8:
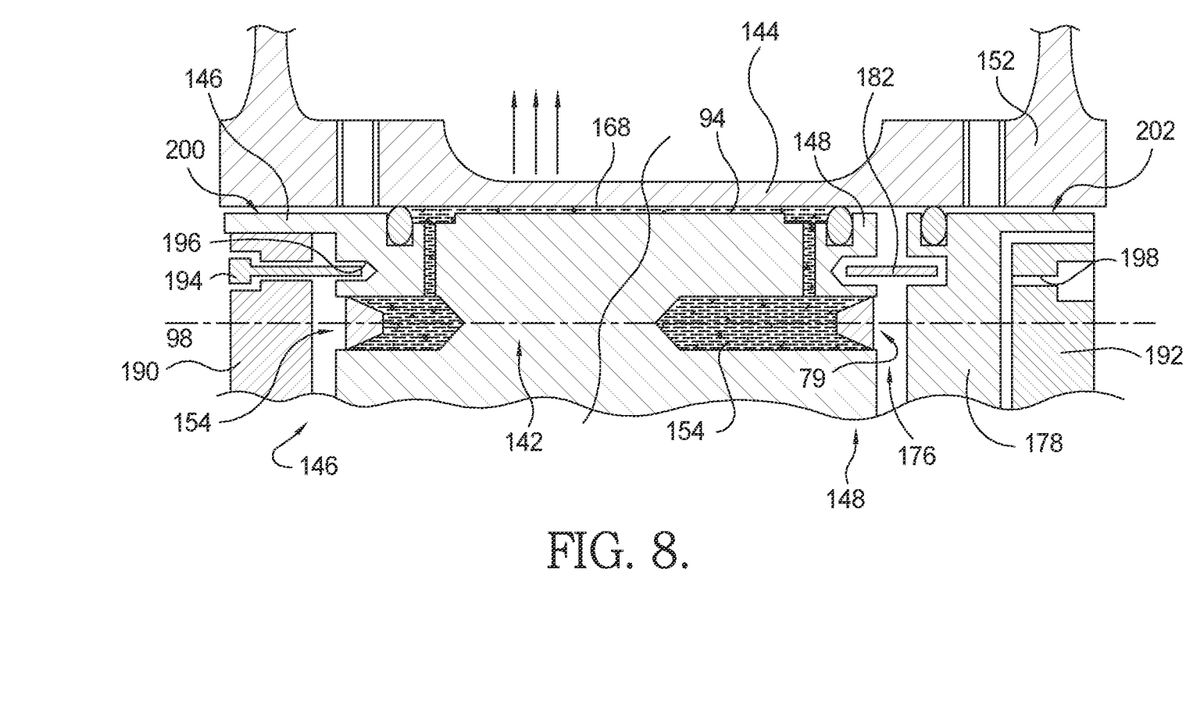
FIG. 8 is a diagram of a modified internal viscous rotational damper assembly with backup and cap features in accordance with another exemplary embodiment.

FIG. 8 shows VRD assembly 140 that can be used in association with drive member connector 42 and load member connector 44 shown in FIG. 4 to form a flexure spacer coupling. VRD assembly 140 includes a damper bar 142 disposed within spacer tube 144 of the spacer assembly, along with backup and cap features according to another example embodiment of the present invention. FIG. 9 shows an enlarged view of a first end 146 of damper bar 142 connected with spacer tube 144 at or near a first end 150 on the drive machine side. FIG. 10 shows an enlarged view of a second end 148 of damper bar 142 that is not connected with spacer tube 144 at or near a second end 152 on the load machine side.

Figure 9:
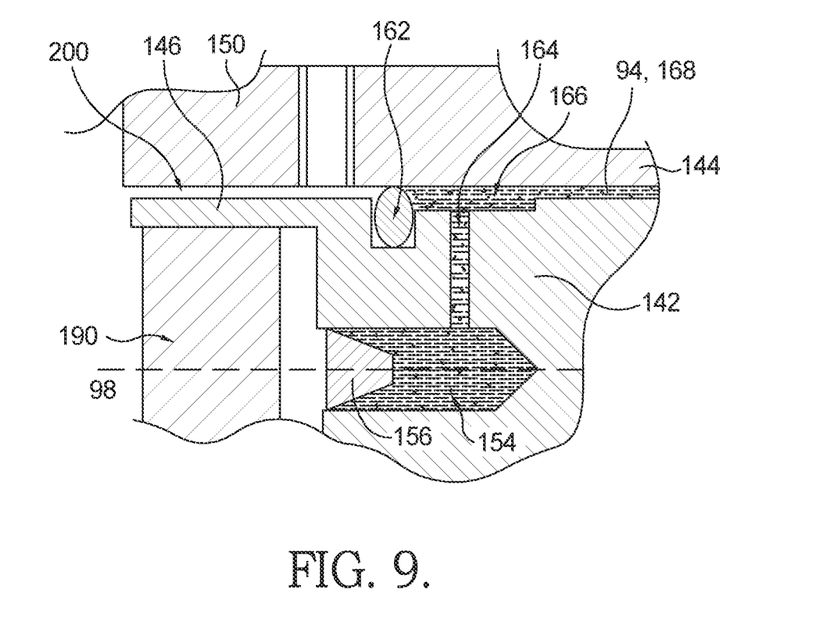
FIG. 9 shows an enlarged view of the connected end of the damper bar shown in FIG. 8.
Figure 10:
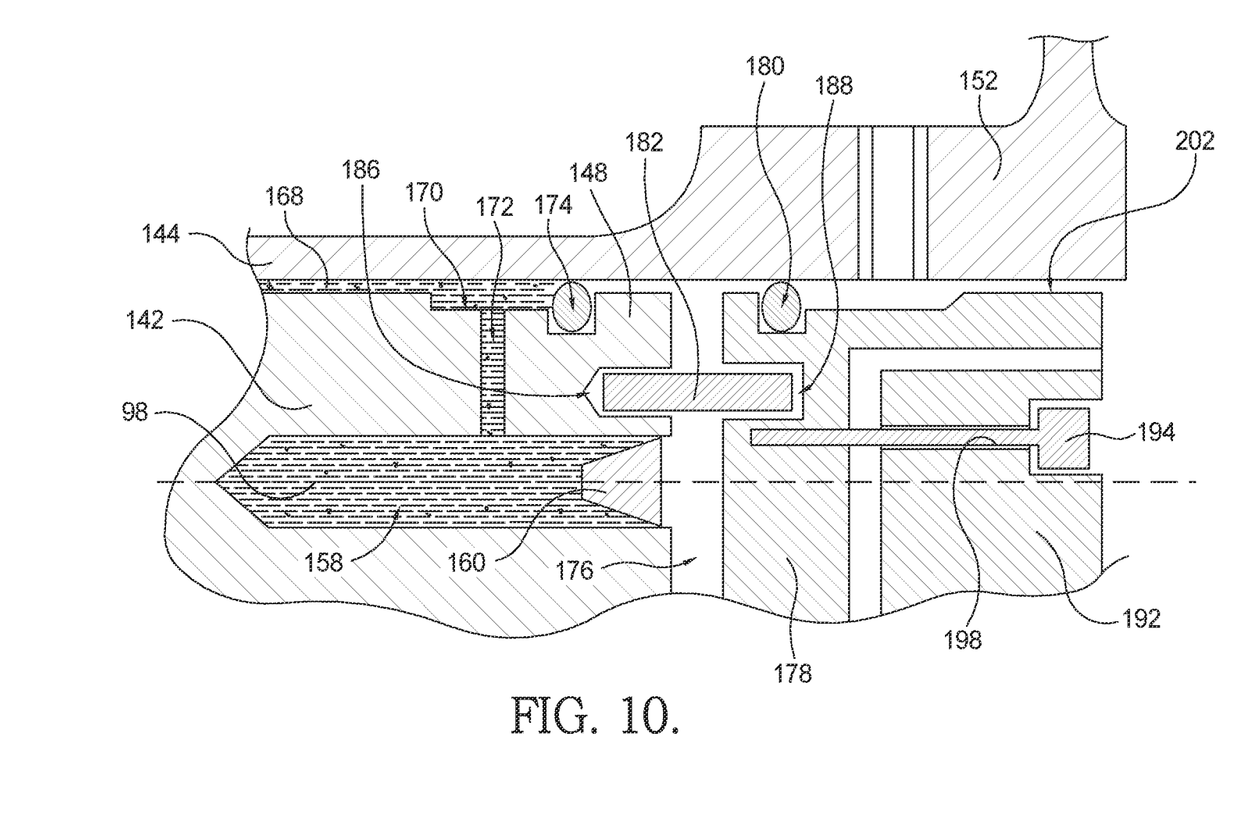
FIG. 10 shows an enlarged view of the free end of the damper bar shown in FIG. 8.

Elements 154, 156, 158, 160 of damper bar 142 as shown in FIGS. 8-10 are similar to elements 120, 124, 132, 134 of damper bar 92 described above with respect to FIGS. 5 and 6, so the above description applies similarly to these elements and will not be repeated. Also shown in FIG. 9, at or near first end 146 of damper bar 142 is a seal 162 (e.g., a gasket), a distribution port 164, and a distribution channel 166, wherein distribution port 164 fluidly connects fill port 154 with distribution channel 166 and cavity 168 that is configured to have damping fluid 94 disposed therein. Similarly, as shown in FIG. 10, at or near second end 148 of damper bar 142 is a distribution channel 170, a distribution port 172, and a seal 174 (e.g., a gasket), wherein distribution port 172 fluidly connects buffer chamber 158 with distribution channel 170 and cavity 168 that is configured to be filled with damping fluid 94. Although not mentioned above with reference to FIGS. 5 and 6, VRD assembly 90 and damper bar 92 may have a similar configuration of these distribution port/channel and seal elements as can be seen but are unlabeled in FIGS. 5 and 6.

First, as seen in FIGS. 8 and 10, VRD assembly 140 as shown in FIGS. 8 and 10 includes a space that is adjacent and to the right of damper bar 142 that is identified as a seepage capture chamber 176. Chamber 176 captures seepage of fluid 94 in the event that the dynamic seal should release fluid 94, such as due to wear, for example. This chamber 176 is bounded by a cap 178 which forms the opposite side of chamber 176. Cap 178 has a stationary seal 180 which will not wear, thereby forming a high integrity seal.

Second, protection against over-torque is provided by a shunt 182, which is an overload device that allows some degree of twist in damper bar 142. When twisting of damper bar 142 reaches a limit of acceptability (a twist threshold), then shunt 182 engages to provide additional resistance to torque load, and thus prevents overload of spacer tube 144. In the modified example embodiment shown in FIGS. 8 and 10, shunt 182 is defined by a set of pins (also referred to as backup pins) that extend between damper bar 142 and cap 178. Further explained, a set of axially oriented backup pins 182 are slidably positioned within a recess 186 formed in damper bar 142 (FIG. 10), and protrude into clearance holes 188 in cap 178. The size (e.g., diameter) of clearance holes 188 is slightly larger than the size (e.g., diameter) of backup pins 182 to allow limiting twisting motion until pin 182 engages the wall of clearance hole 188. In other configurations (not shown in FIGS. 8 and 10), shunt 182 can be formed by incorporating other features in the backup tube that engage directly with the flange member. These other shunt features can be axial teeth, radial teeth, or a set of keys, for example. All of these shunt features will incorporate a clearance which allows some twisting, but engages when the limit (twist threshold) is exceeded.

An additional element of this modified example embodiment of FIG. 8 is the use of clamp plugs 190, 192 in each end of VRD assembly 140, as shown in further detail in FIG. 9 for first end 146 of damper bar 142 and in FIG. 10 for seal cap 178 adjacent to second end 148 of damper bar 142, respectively. The male part of each clamp plug 190, 192 is dimensioned to have a small clearance (e.g., approximately 0.001") with the bore of the mating hole. Once the male piece is positioned properly in the mating hole, retention screws 194 in retention screw holes 196, 198 are torqued, which forces the tapered surfaces to slide and the outer diameter of the male part to expand. Once in contact, additional torque causes pressure at interfaces 200, 202, which causes the surfaces to be tightly engaged and clamped together. These clamped interfaces 200, 202 will resist torque and axial forces through friction. In some other example embodiments, other means can be used to affix the damper bar and the seal cap to the bore, such as keys, splines, or pins, for example.

An additional alternative embodiment of an internal VRD assembly 240 is described below with reference to FIG. 11. VRD assembly 240 may include the features and provide similar advantages as set forth above with regard to VRD assembly 90 of FIGS. 5-7 and VRD assembly 140 of FIGS. 8-10, along with some additional advantages that are provided via an extended cap sidewall which will be described in greater detail below.

Figure 11:
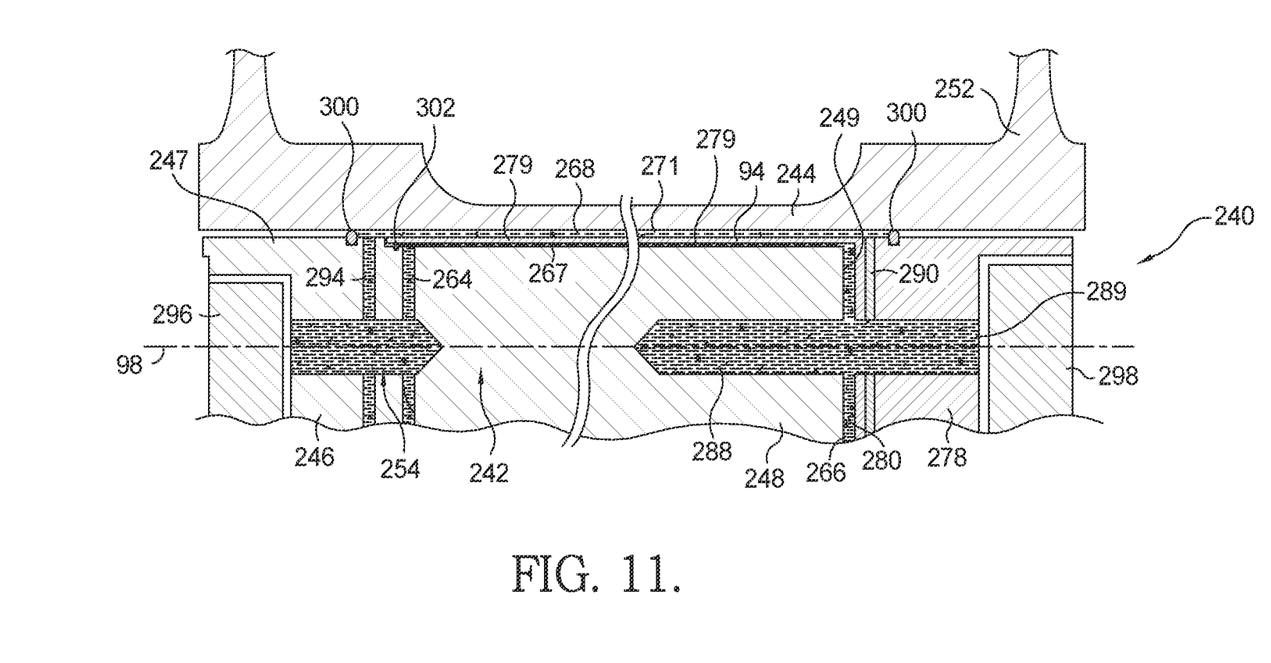
FIG. 11 is a diagram of a modified internal viscous rotational damper assembly with an extended cap sidewall in accordance with a further exemplary embodiment.

FIG. 11 shows VRD assembly 240 that can be used in association with drive member connector 42 and load member connector 44 shown in FIG. 4 to form a flexure spacer coupling. VRD assembly 240 includes a damper bar 242 disposed within a spacer tube 244 of the spacer assembly with a cavity 268 defined therebetween. As described above with respect to the previously disclosed embodiments, a first end 246 of damper bar 242 is connected with spacer tube 244 at or near a first end 150 on the drive machine side while a second end 248 of damper bar 242 is not connected with spacer tube 244 at or near a second end 252 on the load machine side.

VRD 240 may be similar to VRD 140 and include further modifications to damper bar 242 and cap 278. As shown in FIG. 11, VRD assembly 240 may include a modified cap 278 having an extended cap sidewall 279 positioned within cavity 268 so as to bisect or otherwise divide cavity 268 into an inner cavity channel 267 and an outer cavity channel 271. Inner cavity channel 269 is defined by an outer surface of damper bar 242 and an inner surface of extended cap sidewall 279. Outer cavity channel 271 is defined by an inner surface of spacer tube 244 and an outer surface of the extended cap sidewall 279. Viscous fluid 94 may be introduced into inner cavity channel 267 through fill port 254 and a first distribution port 264 defined in first end 246 of damper bar 242, and/or through a fill port 288 defined in second end 248 of damper bar 242, such as via a distribution gap 266 defined between terminal wall 249 of second end 248 of damper bar 242 and the inner wall 280 of cap 278. Further, viscous fluid 94 may be introduced into outer cavity channel 271 through fill port 289 and a distribution port 290 defined in cap 278, and/or through a second distribution port 294 defined in first end 246 of damper bar 242. Fill port 254 may be sealed using a clamp plug 296, and fill port 289 may be sealed using a clamp plug 298. Both inner cavity channel 267 and outer cavity channel 271 may be isolated using seals 300, 302.

In one embodiment, extended cap sidewall 279 may have a length substantially equal to the length of damper bar 242. First end 246 of damper bar 242 may include a stepped portion 247 such that extended cap sidewall 279 and stepped portion 247 form a planar surface. Dividing cavity 268 via extended cap sidewall 279 provides additional damping surfaces within, and effectively extends the range of damping of, the damping chamber.

Accordingly, example embodiments of the present invention described in detail above with reference to FIGS. 5-7, as well as the modified example embodiments of FIGS. 8-10 and FIG. 11, and as set forth in the accompanying claims, addresses the above-described weaknesses associated with the use of elastomeric coupling technology or rubber couplings (FIGS. 1 and 2) and/or leaf spring couplings (FIG. 3), thus allowing for addition of damping into critical high power density applications, which yields improved machinery operation and reliability.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An internal viscous rotational damping (VRD) assembly for transmitting torque from a drive member connector to a load member connector, wherein the drive member connector is rigidly coupled to a driving input shaft, and wherein the load member connector is rigidly coupled to a driven output shaft, the internal VRD assembly comprising:
   a spacer tube including a first end and a second end, wherein the first end is rigidly connected to the drive member connector, wherein the second end is rigidly connected to the load member connector, wherein the spacer tube is configured to continuously transmit torque from the driving input shaft to the driven output shaft, and wherein the spacer tube includes a longitudinal axis and an inner surface that extends along the longitudinal axis; and
   a damper bar disposed within the spacer tube, wherein the damper bar includes an outer surface, wherein a cavity is defined between the outer surface of the damper bar and the inner surface of the spacer tube, and wherein the cavity is configured for receiving a viscous fluid.

2. The internal VRD assembly according to claim 1, wherein the
   damper bar extends between the first end and the second end of the spacer tube.

3. The internal VRD assembly according to claim 2, wherein the damper bar includes:
   a first end fixedly connected to one of the first end of the spacer tube or the second end of the spacer tube; and
   a second end not fixedly connected to the other of the first end of the spacer tuber or the second end of the spacer tube.

4. The internal VRD assembly according to claim 3, wherein the first end of the damper bar includes a fill port defined therein that is in fluid communication with the cavity.

5. The internal VRD assembly according to claim 4, wherein the second end of the damper bar includes a relief port defined therein that is in fluid communication with the cavity.

6. The internal VRD assembly according to claim 5, further comprising a plug configured to be selectively disposed in the relief port for retaining the viscous fluid in the cavity.

7. The internal VRD assembly according to claim 6, wherein a buffer chamber is defined in the second end of the damper bar and configured for receiving the viscous fluid.

8. The internal VRD assembly according to claim 1, wherein the viscous fluid includes gear oil, grease, or other lubricant.

9. A flexure spacer coupling comprising:
   a drive member connector rigidly coupled to a driving shaft;

a load member connector rigidly coupled to a driven shaft;

an internal viscous rotational damping assembly configured for transmitting torque between the drive member connector and the load member connector;

a spacer tube including a first end and a second end, wherein the first end is rigidly connected to the drive member connector, wherein the second end is rigidly connected to the load member connector, wherein the spacer tube is configured to operably transmit torque from the driving input shaft to the driven output shaft, and wherein the spacer tube includes a longitudinal axis and an inner surface that extends along the longitudinal axis;

a damper bar disposed within the spacer tube, wherein the damper bar includes an outer surface, wherein a cavity is defined between the outer surface of the damper bar and the inner surface of the spacer tube; and a viscous fluid disposed within the cavity.

10. An internal viscous rotational damping (VRD) assembly for transmitting torque from a drive member connector to a load member connector, wherein the drive member connector is coupled to a driving input shaft, and wherein the load member connector is coupled to a driven output shaft, the internal VRD assembly comprising:

a spacer tube including a first end and a second end, wherein the first end of the spacer tube is connected to the drive member connector, wherein the second end of the spacer tube is connected to the load member connector, wherein the spacer tube includes a longitudinal axis and an inner surface that extends along the longitudinal axis; and a damper bar disposed within the spacer tube, wherein the damper bar extends between the first end of the spacer tube and the second end of the spacer tube, wherein the damper bar includes an outer surface, wherein the damper bar includes a first end fixedly connected to one of the first end of the spacer tube or the second end of the spacer tube using at least one key disposed between the inner surface of the spacer tube and the outer surface of the damper bar, and wherein the damper bar further includes a second end not fixedly connected to the other of the first end of the spacer tuber or the second end of the spacer tube, wherein a cavity is defined between the outer surface of the damper bar and the inner surface of the spacer tube, and wherein the cavity is configured for receiving a viscous fluid.

11. The internal VRD assembly according to claim 10, wherein the at least one key is a plurality of keys, and the plurality of keys are radially disposed about the longitudinal axis of the spacer tube.

12. The internal VRD assembly according to claim 10, wherein the first end of the damper bar includes a fill port defined therein that is in fluid communication with the cavity.

13. The internal VRD assembly according to claim 12, further comprising a plug configured to be selectively disposed in the fill port for retaining the viscous fluid in the cavity.

14. The internal VRD assembly according to claim 12, wherein the second end of the damper bar includes a relief port defined therein that is in fluid communication with the cavity.

15. The internal VRD assembly according to claim 14, further comprising a plug configured to be selectively disposed in the relief port for retaining the viscous fluid in the cavity.

16. The internal VRD assembly according to claim 15, wherein a buffer chamber is defined in the second end of the damper bar and configured for receiving the viscous fluid.

17. The internal VRD assembly according to claim 10, wherein the viscous fluid includes gear oil, grease, or other lubricant.

18. The internal VRD assembly according to claim 10, further comprising:

a cap disposed adjacent to the second end of the damper bar; and a shunt installed between the second end of the damper bar and the cap, wherein the shunt is configured to allow the damper bar to twist to provide protection against over-torque between the drive member connector and the load member connector.

19. The internal VRD unit according to claim 18, further comprising:

a seepage capture chamber defined between the second end of the damper bar and the cap, wherein the seepage capture chamber is configured to capture seepage of the viscous fluid.

20. The internal VRD assembly according to claim 18, wherein the shunt is defined by a set of axially oriented pins that extend between the second end of the damper bar and the cap, wherein the pins are fixed to the second end of the damper bar and extend into corresponding apertures defined in the cap.

21. The internal VRD assembly according to claim 20, wherein the apertures defined in the cap are configured for receiving the pins to allow limited twisting motion of the pins until the pin engages a wall of the corresponding aperture.

22. The internal VRD assembly according to claim 18, wherein the cap includes an extended cap sidewall that is disposed within the cavity, wherein the extended cap sidewall divides the cavity into an inner cavity channel and an outer cavity channel, wherein the inner cavity channel is defined by an outer surface of the damper bar and the inner surface of the extended cap sidewall, and wherein the outer cavity channel is defined by the inner surface of the spacer tube and the outer surface of the extended cap sidewall.

23. The internal VRD assembly according to claim 22, wherein the outer cavity channel is isolated from the environment by one or more first seals.

24. The internal VRD assembly according to claim 23, wherein the inner cavity channel is isolated from the outer cavity channel by one or more second seals.

25. An internal viscous rotational damping (VRD) assembly for transmitting torque from a drive member connector to a load member connector, wherein the drive member connector is coupled to a driving input shaft, and wherein the load member connector is coupled to a driven output shaft, the internal VRD assembly comprising:

a spacer tube includes a first end and a second end, wherein the first end of the spacer tube is connected to the drive member connector, wherein the second end of the spacer tube is connected to the load member connector, wherein the spacer tube includes a longitudinal axis and an inner surface that extends along the longitudinal axis; and a damper bar disposed within the spacer tube, wherein the damper bar extends between the first end of the spacer tube and the second end of the spacer tube, wherein the damper bar includes an outer surface, and wherein the damper bar includes a first end fixedly connected to one of the first end of the spacer tube or the second end of the spacer tube and a second end not fixedly connected to the other of the first end of the spacer tuber or the second end of the spacer tube, wherein a cavity is defined between the outer surface of the damper bar and the inner surface of the spacer tube, and wherein the cavity is configured for receiving a viscous fluid, wherein the first end of the damper bar includes a fill port defined therein that is in fluid communication with the cavity; and a plug configured to be selectively disposed in the fill port for retaining the viscous fluid in the cavity.

26. The internal VRD assembly according to claim 25, wherein the first end of the damper bar is fixedly connected with the one of the first end of the spacer tube or the second end of the spacer using at least one key disposed between the inner surface of the spacer tube and the outer surface of the damper bar, wherein the at least one key is a plurality of keys, and the plurality of keys are radially disposed about the longitudinal axis of the spacer tube.

27. The internal VRD assembly according to claim 25, wherein the second end of the damper bar includes a relief port defined therein that is in fluid communication with the cavity.

28. The internal VRD assembly according to claim 27, further comprising a plug configured to be selectively disposed in the relief port for retaining the viscous fluid in the cavity.

29. The internal VRD assembly according to claim 28, wherein a buffer chamber is defined in the second end of the damper bar and configured for receiving the viscous fluid.

30. The internal VRD assembly according to claim 25, wherein the viscous fluid includes gear oil, grease, or other lubricant.

31. The internal VRD unit according to claim 25, further comprising:

a cap disposed adjacent to the second end of the damper bar;

a shunt installed between the second end of the damper bar and the cap, wherein the shunt is configured to allow the damper bar to twist to provide protection against over-torque between the drive member connector and the load member connector; and a seepage capture chamber defined between the second end of the damper bar and the cap, wherein the seepage capture chamber is configured to capture seepage of the viscous fluid.

32. The internal VRD assembly according to claim 31, wherein the shunt is defined by a set of axially oriented pins that extend between the second end of the damper bar and the cap, wherein the pins are fixed to the second end of the damper bar and extend into corresponding apertures defined in the cap.

33. The internal VRD assembly according to claim 32, wherein the apertures defined in the cap are configured for receiving the pins to allow limited twisting motion of the pins until the pin engages a wall of the corresponding aperture.

34. The internal VRD assembly according to claim 31, wherein the cap includes an extended cap sidewall that is disposed within the cavity, wherein the extended cap sidewall divides the cavity into an inner cavity channel and an outer cavity channel, wherein the inner cavity channel is defined by an outer surface of the damper bar and the inner surface of the extended cap sidewall, and wherein the outer cavity channel is defined by the inner surface of the spacer tube and the outer surface of the extended cap sidewall.

35. The internal VRD assembly according to claim 34, wherein the outer cavity channel is isolated from the environment by one or more first seals.

36. The internal VRD assembly according to claim 35, wherein the inner cavity channel is isolated from the outer cavity channel by one or more second seals.

37. An internal viscous rotational damping (VRD) assembly for transmitting torque from a drive member connector to a load member connector, wherein the drive member connector is coupled to a driving input shaft, and wherein the load member connector is coupled to a driven output shaft, the internal VRD assembly comprising:

a spacer tube including a first end and a second end, wherein the first end of the spacer tube is connected to the drive member connector, wherein the second end of the spacer tube is connected to the load member, and wherein the spacer tube includes a longitudinal axis and an inner surface that extends along the longitudinal axis;

a damper bar disposed within the spacer tube, wherein the damper bar extends between the first end of the spacer tube and the second end of the spacer tube, wherein the damper bar includes an outer surface, and wherein the damper bar includes a first end fixedly connected to one of the first end of the spacer tube or the second end of the spacer tube, wherein the damper bar includes a second end not fixedly connected to the other of the first end of the spacer tuber or the second end of the spacer tube, wherein a cavity is defined between the outer surface of the damper bar and the inner surface of the spacer tube, and wherein the cavity is configured for receiving a viscous fluid;

a cap disposed adjacent to the second end of the damper bar; and a shunt installed between the second end of the damper bar and the cap, wherein the shunt is configured to allow the damper bar to twist to provide protection against over-torque between the drive member connector and the load member connector.

38. The internal VRD assembly according to claim 37, wherein the first end of the damper bar includes a fill port defined therein that is in fluid communication with the cavity.

39. The internal VRD assembly according to claim 38, further comprising a plug configured to be selectively disposed in the fill port for retaining the viscous fluid in the cavity.

40. The internal VRD assembly according to claim 38, wherein the second end of the damper bar includes a relief port defined therein that is in fluid communication with the cavity.

41. The internal VRD assembly according to claim 40, further comprising a plug configured to be selectively disposed in the relief port for retaining the viscous fluid in the cavity.

42. The internal VRD assembly according to claim 41, wherein a buffer chamber is defined in the second end of the damper bar and configured for receiving the viscous fluid.

43. The internal VRD assembly according to claim 37, wherein the viscous fluid includes gear oil, grease, or other lubricant.

44. The internal VRD unit according to claim 37, further comprising:

a seepage capture chamber defined between the second end of the damper bar and the cap, wherein the seepage capture chamber is configured to capture seepage of the viscous fluid.

45. The internal VRD assembly according to claim 37, wherein the shunt is defined by a set of axially oriented pins that extend between the second end of the damper bar and the cap, wherein the pins are fixed to the second end of the damper bar and extend into corresponding apertures defined in the cap.

46. The internal VRD assembly according to claim 45, wherein the apertures defined in the cap are configured for receiving the pins to allow limited twisting motion of the pins until the pin engages a wall of the corresponding aperture.

47. The internal VRD assembly according to claim 37, wherein the cap includes an extended cap sidewall that is disposed within the cavity, wherein the extended cap sidewall divides the cavity into an inner cavity channel and an outer cavity channel, wherein the inner cavity channel is defined by an outer surface of the damper bar and the inner surface of the extended cap sidewall, and wherein the outer cavity channel is defined by the inner surface of the spacer tube and the outer surface of the extended cap sidewall.

48. The internal VRD assembly according to claim 47, wherein the outer cavity channel is isolated from the environment by one or more first seals.

49. The internal VRD assembly according to claim 48, wherein the inner cavity channel is isolated from the outer cavity channel by one or more second seals.

50. An internal viscous rotational damping (VRD) assembly for transmitting torque from a drive member connector to a load member connector, wherein the drive member connector is coupled to a driving input shaft, and wherein the load member connector is coupled to a driven output shaft, the internal VRD assembly comprising:
 a spacer tube includes a first end and a second end, wherein the first end of the spacer tube is connected to the drive member connector, wherein the second end of the spacer tube is connected to the load member connector, wherein the spacer tube includes a longitudinal axis and an inner surface that extends along the longitudinal axis;
 a damper bar disposed within the spacer tube, wherein the damper bar extends between the first end of the spacer tube and the second end of the spacer tube, wherein the damper bar includes an outer surface, and wherein the damper bar includes a first end fixedly connected to one of the first end of the spacer tube or the second end of the spacer tube and a second end not fixedly connected to the other of the first end of the spacer tuber or the second end of the spacer tube, wherein a cavity is defined between the outer surface of the damper bar and the inner surface of the spacer tube, and wherein the cavity is configured for receiving a viscous fluid; and
 a cap disposed adjacent to the second end of the damper bar, wherein the cap includes an extended cap sidewall that is disposed within the cavity, wherein the extended cap sidewall divides the cavity into an inner cavity channel and an outer cavity channel, wherein the inner cavity channel is defined by an outer surface of the damper bar and the inner surface of the extended cap sidewall, and wherein the outer cavity channel is defined by the inner surface of the spacer tube and the outer surface of the extended cap sidewall.

51. The internal VRD assembly according to claim 50, wherein the first end of the damper bar is fixedly connected with the one of the first end of the spacer tube or the second end of the spacer using at least one key disposed between the inner surface of the spacer tube and the outer surface of the damper bar.

52. The internal VRD assembly according to claim 51, wherein the at least one key is a plurality of keys, and the plurality of keys are radially disposed about the longitudinal axis of the spacer tube.

53. The internal VRD assembly according to claim 50, wherein the first end of the damper bar includes a fill port defined therein that is in fluid communication with the cavity.

54. The internal VRD assembly according to claim 53, further comprising a plug configured to be selectively disposed in the fill port for retaining the viscous fluid in the cavity.

55. The internal VRD assembly according to claim 53, wherein the second end of the damper bar includes a relief port defined therein that is in fluid communication with the cavity.

56. The internal VRD assembly according to claim 55, further comprising a plug configured to be selectively disposed in the relief port for retaining the viscous fluid in the cavity.

57. The internal VRD assembly according to claim 56, wherein a buffer chamber is defined in the second end of the damper bar and configured for receiving the viscous fluid.

58. The internal VRD assembly according to claim 50, wherein the viscous fluid includes gear oil, grease, or other lubricant.

59. The internal VRD unit according to claim 58, further comprising:
 a seepage capture chamber defined between the second end of the damper bar and the cap, wherein the seepage capture chamber is configured to capture seepage of the viscous fluid.

60. The internal VRD assembly according to claim 58, wherein the shunt is defined by a set of axially oriented pins that extend between the second end of the damper bar and the cap, wherein the pins are fixed to the second end of the damper bar and extend into corresponding apertures defined in the cap.

61. The internal VRD assembly according to claim 60, wherein the apertures defined in the cap are configured for receiving the pins to allow limited twisting motion of the pins until the pin engages a wall of the corresponding aperture.

62. The internal VRD assembly according to claim 50, wherein the outer cavity channel is isolated from the environment by one or more first seals.

63. The internal VRD assembly according to claim 62, wherein the inner cavity channel is isolated from the outer cavity channel by one or more second seals.

* * * * *